(12) United States Patent
Jung

(10) Patent No.: US 12,431,563 B2
(45) Date of Patent: Sep. 30, 2025

(54) EXTERIOR FOR SECONDARY BATTERY AND SECONDARY BATTERY HAVING THE SAME

(71) Applicant: LG Chem, Ltd., Seoul (KR)

(72) Inventor: Bum Young Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1258 days.

(21) Appl. No.: 16/982,834

(22) PCT Filed: Dec. 12, 2019

(86) PCT No.: PCT/KR2019/017572
§ 371 (c)(1),
(2) Date: Sep. 21, 2020

(87) PCT Pub. No.: WO2020/175777
PCT Pub. Date: Sep. 3, 2020

(65) Prior Publication Data
US 2021/0057682 A1    Feb. 25, 2021

(30) Foreign Application Priority Data

Feb. 27, 2019  (KR) .................. 10-2019-0023122

(51) Int. Cl.
*B32B 7/027*      (2019.01)
*B32B 7/12*       (2006.01)
(Continued)

(52) U.S. Cl.
CPC .......... *H01M 50/124* (2021.01); *B32B 7/027* (2019.01); *B32B 7/12* (2013.01); *B32B 15/043* (2013.01);
(Continued)

(58) Field of Classification Search
CPC ... H01M 50/124; H01M 50/116; B32B 7/027; B32B 7/12; B32B 15/043; B32B 15/088;
(Continued)

(56) References Cited

U.S. PATENT DOCUMENTS 6,207,271 B1 *  3/2001  Daroux ................. B32B 15/08
                                                     428/335
9,553,284 B2 *  1/2017  Minamibori ........... B32B 15/08
(Continued)

FOREIGN PATENT DOCUMENTS

CN    103221896 A    7/2013
CN    105938879 A    9/2016
(Continued)

OTHER PUBLICATIONS

English Language Translation of JP-2014086361-A (Year: 2014).*
(Continued)

*Primary Examiner* — Maria V Ewald
*Assistant Examiner* — Daniel P Dillon
(74) *Attorney, Agent, or Firm* — Lerner David LLP

(57) ABSTRACT

Disclosed are an exterior for a secondary battery and a secondary battery.
According to one aspect of the present invention, an exterior for a secondary battery, in which an internal space is defined, includes a first metal part and a second metal part spaced apart from the first metal part, wherein the first metal part is disposed closer to the internal space than the second metal part, and the first metal part has a thermal conductivity greater than a thermal conductivity of the second metal part.

10 Claims, 5 Drawing Sheets

(51) Int. Cl.
  *B32B 15/04* (2006.01)
  *B32B 15/085* (2006.01)
  *B32B 15/088* (2006.01)
  *B32B 15/09* (2006.01)
  *B32B 15/20* (2006.01)
  *B32B 27/36* (2006.01)
  *H01M 50/10* (2021.01)
  *H01M 50/116* (2021.01)
  *H01M 50/124* (2021.01)
  *H01M 50/143* (2021.01)

(52) U.S. Cl.
  CPC ............ *B32B 15/088* (2013.01); *B32B 15/09* (2013.01); *B32B 15/20* (2013.01); *H01M 50/10* (2021.01); *H01M 50/116* (2021.01); *H01M 50/143* (2021.01); *B32B 2307/302* (2013.01); *B32B 2457/10* (2013.01)

(58) Field of Classification Search
  CPC ... B32B 15/09; B32B 15/20; B32B 2307/302; B32B 2457/10
  USPC ......................................................... 428/212
  See application file for complete search history.

(56) References Cited

U.S. PATENT DOCUMENTS

| | | | |
|---|---|---|---|
| 2007/0065718 A1* | 3/2007 | Moon ................ | H01M 50/143 429/185 |
| 2008/0254348 A1 | 10/2008 | Hatta et al. | |
| 2013/0236773 A1 | 9/2013 | Nagata | |
| 2016/0260552 A1 | 9/2016 | Sato et al. | |
| 2020/0280112 A1 | 9/2020 | Han et al. | |
| 2020/0295316 A1 | 9/2020 | Kim et al. | |

FOREIGN PATENT DOCUMENTS

| | | | | |
|---|---|---|---|---|
| EP | 3579294 | A1 | 12/2019 | |
| EP | 3618137 | A1 | 3/2020 | |
| JP | 2011187386 | A | 9/2011 | |
| JP | 2014053126 | A | 3/2014 | |
| JP | 2014086361 | A * | 5/2014 | |
| JP | 2016167575 | A | 9/2016 | |
| JP | 2017126491 | A | 7/2017 | |
| KR | 20060102823 | A | 9/2006 | |
| KR | 20080037195 | A | 4/2008 | |
| KR | 20080092871 | A | 10/2008 | |
| KR | 20140148121 | A | 12/2014 | |
| KR | 20170002221 | A | 1/2017 | |
| KR | 20180085456 | A | 7/2018 | |
| KR | 101896922 | B1 | 9/2018 | |
| WO | 2012024578 | A2 | 2/2012 | |
| WO | WO-2018135767 | A2 * | 7/2018 | .............. H01M 2/02 |

OTHER PUBLICATIONS

English Language Translation of WO-2018135767-A2 (Year: 2018).*
Search Report for European Application No. 19917286.7 dated Nov. 19, 2021. 2 pgs.
Search Report for Chinese Application No. 201980018092. 7 dated Dec. 1, 2021. 3 pgs.
International Search Report from PCT/KR2019/017572, dated Mar. 23, 2020, pp. 1-2.

* cited by examiner

EXTERIOR FOR SECONDARY BATTERY AND SECONDARY BATTERY HAVING THE SAME

CROSS-REFERENCE TO RELATED APPLICATION

The present application is a national phase entry under 35 U.S.C § 371 of International Application No. PCT/KR2019/017572, filed on Dec. 12, 2019, published in Korean, which claims priority to Korean Patent Application No. 10-2019-0023122, filed on Feb. 27, 2019, the disclosures of which are hereby incorporated herein by reference in their entireties.

TECHNICAL FIELD

The present invention relates to an exterior for a secondary battery and a secondary battery including the exterior, and more particularly, to an exterior for a secondary battery, which has a structure capable of solving an ignition problem of the secondary battery while improving corrosion resistance to an electrolyte, and a secondary battery including the exterior.

BACKGROUND ART

Secondary batteries that are repetitively chargeable and dischargeable may be divided into cylindrical type secondary batteries, prismatic type secondary batteries, and pouch type secondary batteries according to their manufacturing methods or structures. Among them, in general, such a pouch type secondary battery has a structure in which an electrode assembly having a structure, in which electrodes and separators are alternately disposed in a sheet-shaped pouch exterior, is accommodated. In particular, the pouch type secondary battery has been widely used due to its relatively simple process and low manufacturing cost.

According to the related art, the sheet-shaped pouch is constituted by a plurality of layers made of different materials. Particularly, it is common that the pouch includes an aluminum layer. Here, an insulation layer configured to prevent an electrolyte and moisture from being permeated is provided on an inner surface of the aluminum layer. The insulation layer serves to prevent the aluminum layer from being polarized ordinarily by preventing the aluminum layer from being electrically connected to a positive electrode or a negative electrode.

However, according to the related art, when the insulation is damaged while the secondary battery is manufactured or used, the electrolyte and the moisture may be permeated through the damaged gap, resulting in a problem that the aluminum layer is damaged. Particularly, when the insulation layer is damaged in the lithium secondary battery, while the electrolyte is permeated into the aluminum layer, lithium ions within the electrolyte react with the aluminum layer to cause oxidization and corrosion of the aluminum layer, resulting in cracks in the aluminum layer, thereby damaging the pouch.

DISCLOSURE OF THE INVENTION

Technical Problem

Therefore, an object of the present invention for solving the above problem is to minimize damage of an exterior, which occurs by reaction between an electrolyte and the exterior during the use of a secondary battery.

Particularly, an object of the present invention for solving the above problem is to minimize damage of an aluminum layer, which occurs when the aluminum layer is polarized due to damage of an insulation layer.

Technical Solution

According to one aspect of the present invention for achieving the above object, an exterior for a secondary battery, in which an internal space is defined, includes: a first metal part; a second metal part spaced apart from the first metal part; and a first adhesive part provided between the first metal part and the second metal part to adhere to each of the first metal part and the second metal part, wherein the first metal part is provided closer to the internal space than the second metal part, and the first metal part has thermal conductivity greater than that of the second metal part.

A flame retardant material may be mixed in the first adhesive part.

The first metal part or the second metal part may be made of a clad material.

The flame retardant material may include one or more of phosphorus-based compounds, nitrogen-based compounds, halogen-based compounds, antimony-based compounds, molybdenum-based compounds, zinc borate-based compounds, and metal hydroxides.

The exterior may further include: an insulation part provided to be spaced apart from the first metal part in a direction of the internal space and having an electrical insulation property; and a second adhesive part provided between the first metal part and the insulation part to adhere to each of the first metal part and the insulation part.

The first metal part may include: a first layer including a first material; and a second layer including a second material, wherein the first layer may be provided closer to the internal space than the second layer, and the first layer may have thermal conductivity greater than that of the second layer.

The second metal part may include: a third layer including a third material; and a fourth layer including a fourth material, wherein the third layer may be provided closer to the internal space than the fourth layer, and the third layer may have thermal conductivity greater than that of the fourth layer.

The first material may include copper, and the second material may include aluminum.

The third material may include copper, and the fourth material may include aluminum.

Each of the first adhesive part and the second adhesive part may include acid modified polypropylene (PPa), and the insulation part may include cast polypropylene (CPP).

The exterior may further include: a first outer surface part laminated on an outer surface of the second metal part; and a second outer surface part laminated on an outer surface of the first outer surface part, wherein the first outer surface part may include oriented nylon (O-nylon), and the second outer surface part may include polyethylene terephthalate (PET).

According to another aspect of the present invention for achieving the above object, a secondary battery includes: an electrode assembly; and the exterior for the secondary battery, which accommodates the electrode assembly.

Advantageous Effects

According to the present invention, the damage of the exterior, which occurs by the reaction between the electrolyte and the exterior during the use of the secondary battery may be minimized.

Particularly, the damage of the aluminum layer, which occurs when the aluminum layer is polarized due to the damage of the insulation layer may be minimized.

MODE FOR CARRYING OUT THE INVENTION

Hereinafter, structures of an exterior for a secondary battery and the secondary battery according to the present invention will be described with reference to the accompanying drawings.

Exterior for Secondary Battery and Secondary Battery

Figure 1:
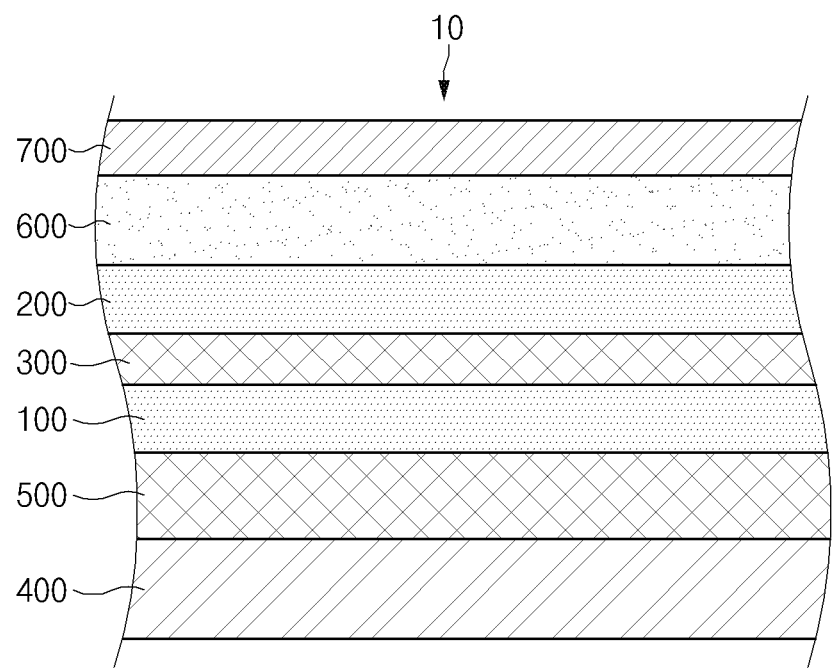
FIG. 1 is an enlarged cross-sectional view illustrating a layered structure of an exterior for a secondary battery according to the present invention.

FIG. 1 is an enlarged cross-sectional view illustrating a layered structure of an exterior for a secondary battery according to the present invention.

An exterior for secondary battery 10 (hereinafter, referred to as an 'exterior') according to the present invention may have a layered structure including a plurality of layers made of different materials as illustrated in FIG. 1. Also, the exterior 10 may be an exterior having a sheet shape with a thin thickness. Also, an internal space may be defined in the exterior 10. The internal space may be a space in which an electrode assembly constituted by electrodes and separators is accommodated. Also, the exterior 10 according to the present invention may be an exterior used in a pouch type secondary battery.

As illustrated in FIG. 1, the exterior 10 may include a first metal part 100 and a second metal part 200 spaced apart from the first metal part 100.

Also, a first adhesive part 300 that adheres to each of the first metal part 100 and the second metal part 200 to prevent the first metal part 100 and the second metal part 200 from relatively moving with respect to each other may be provided between the first metal part 100 and the second metal part 200. The first adhesive part 300 may include acid modified polypropylene (PPa). The PPa may mean a material having a structure in which maleic acid is bonded to polypropylene.

As described above, the internal space may be defined in the exterior 10. The first metal part 100 may be provided closer to the internal space than the second metal part 200.

Also, the exterior 10 according to the present invention may further include an insulation part 400 spaced apart from the first metal plate 100 in a direction of the internal space of the exterior 10 and having an electrical insulation property and a second adhesive part 500 provided between the first metal part 100 and the insulation part 400. Similar to the case of the first adhesive part 300, the second adhesive part 500 may be configured to prevent the first metal part 100 and the insulation part 400 from relatively moving with respect to each other. Thus, the second adhesive part 500 may adhere to each of the first metal part 100 and the insulation part 400. Similar to the first adhesive part 300, the second adhesive part 500 may also include acid modified polypropylene (PPa). The insulation part 400 may include cast polypropylene (CPP). The insulation part 400 may be made of CPP.

Sequentially, referring to FIG. 1, the exterior 10 according to the present invention may further include a first outer surface part 600 laminated on an outer surface of the second metal part 200 and a second outer surface part 700 laminated on an outer surface of the first outer surface part 600. 'The outer surface of the second metal part and the outer surface of the first outer surface part' may mean surfaces (the top surface in FIG. 1), which do not face the internal space defined in the exterior 10 among both surfaces (the top and bottom surfaces of FIG. 1) of the second metal part and the first outer surface part. The first outer surface part 600 may include oriented nylon (O-nylon), and the second outer surface part 700 may include polyethylene terephthalate (PET). Alternatively, the first outer surface part 600 may be made of O-nylon, and the second outer surface part 700 may be made of PET.

Here, according to the present invention, the first metal part 100 may have thermal conductivity greater than that of the second metal part 200. Also, the first metal part 100 and the second metal part 200 may have the same thickness. Also, the thicknesses of the first metal part 100 and the second metal part 200 may be selected according to elongation rates of the first metal part 100 and the second metal part 200 and a depth at which a cup is formed in the exterior by pressing a portion of the exterior.

In the pouch type secondary battery, the insulation part provided at the innermost side of the exterior may prevent the electrolyte, the moisture, and the like from being permeated into the exterior. Thus, a metal within the exterior may be prevented from contacting the electrolyte and the like. However, the insulation part may be cracked by an impact or the like while the cup having a concave shape is formed by pressing a portion of the exterior or while the second battery is used. In this case, the electrolyte may be permeated through the cracks generated in the insulation part to meet the metal part within the exterior.

Particularly, in the case of a lithium secondary battery, lithium ions are present, and also, an electric potential may be generated in the metal part within the exterior during an operation of the secondary battery. For example, (i) when the sealing between the electrode lead (not shown) protruding to the outside and the exterior in the secondary battery is excessive, (ii) when the shape of the electrode lead is deformed, and (iii) when the electrode within the secondary battery leans to one side to contact the exterior, the metal part within the exterior may be electrically connected to the electrode assembly to generate an electric potential in the metal part.

Here, as the electric potential generated in the metal part is changed, a process in which the lithium ions are intercalated and then deintercalated is repeated to generate the cracks in the metal part. The cracks generated in a portion of the metal part due to the reaction between the lithium ions and the metal part may be spread into the entire region of the metal part, resulting in rapid deterioration in durability of the exterior.

Figure 4:
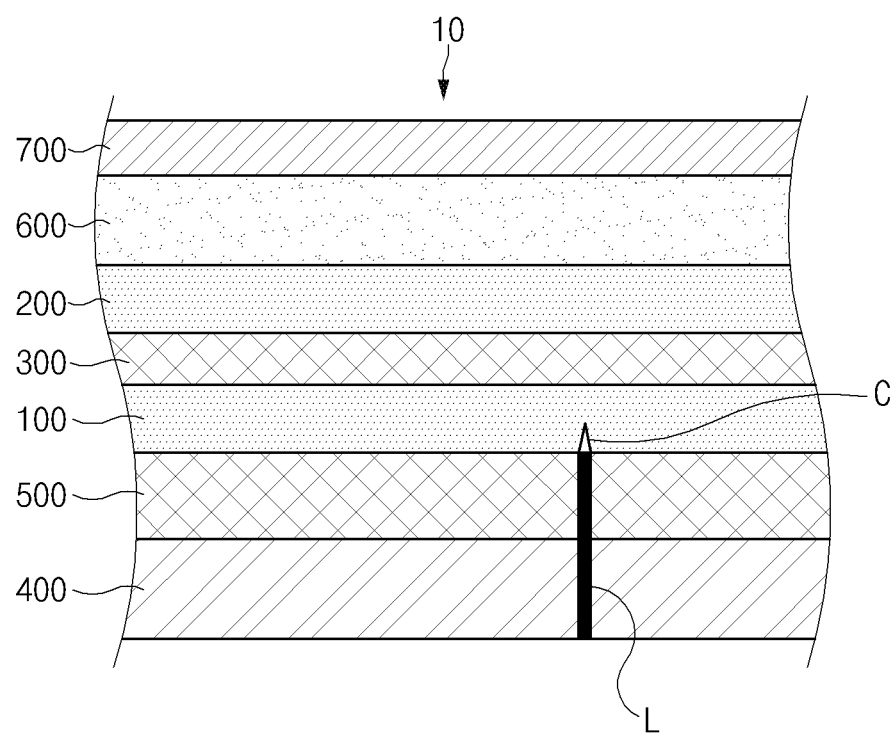
FIG. 4 is a cross-sectional view illustrating an initial state when the first metal part and the electrolyte meet each other in the exterior for the secondary battery according to the present invention.
Figure 5:
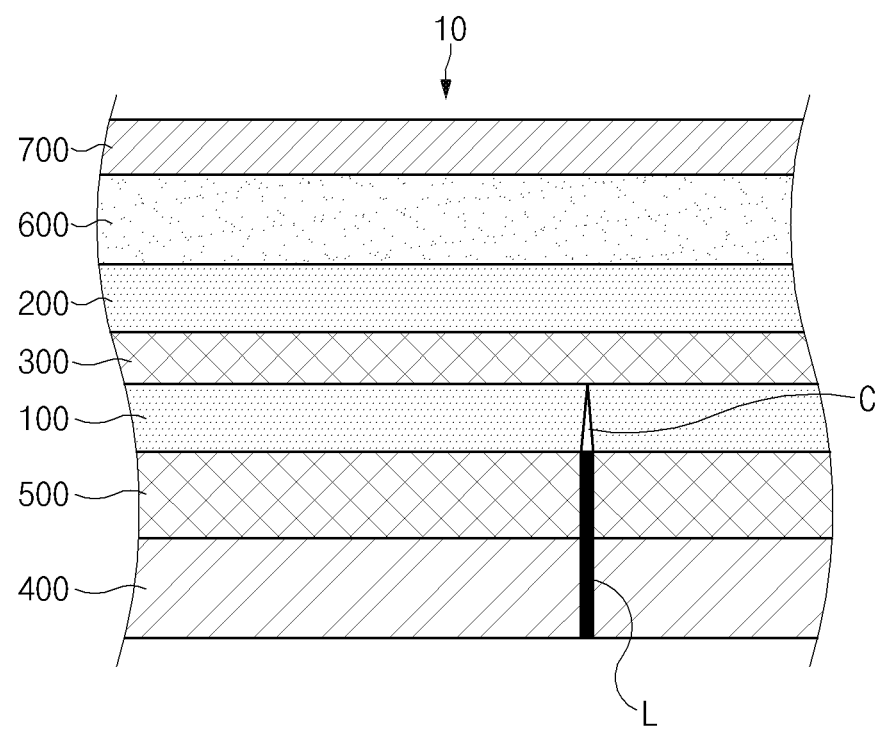
FIG. 5 is a cross-sectional view illustrating a later state when the first metal part and the electrolyte meet each other in the exterior for the secondary battery according to the present invention.

However, according to the present invention, the metal part within the exterior 10 may be divided into the first metal part 100 and the second metal part 200. Here, the first metal part 100 and the second metal part 200 may be spaced apart from each other. As a result, when the cracks occur in the insulation part 400, even if the cracks occur in the first metal part 100 that first meets the electrolyte, the cracks may be prevented from being spread to the second metal part 200. Thus, the cracks may be prevented from being spread to the entire region of the metal part of the exterior 10, thereby minimizing damage of the exterior 10. That is, according to the present invention, as illustrated in FIG. 4, even if cracks C occur in a portion of the first metal part 100 initially after the first metal part 100 and an electrolyte L meet each other to react in the exterior for the secondary battery according to the present invention, the cracks C may be limited to only the first metal part 100 as illustrated in FIG. 5 to prevent the cracks C generated in the first metal part 100 from being spread to the second metal part 200.

The temperature within the secondary battery may increase due to overcharging, internal short circuit, or continuous use for a long time of the secondary battery during the use of the secondary battery. In this case, it is necessary to quickly release heat within the secondary battery to the outside. Particularly, this heat dissipation needs to occur more quickly in a region adjacent to the electrode assembly in which heat is generated. This is done because, when the heat dissipation in the region adjacent to the electrode assembly does not occur quickly, the temperature of the electrode assembly continues to increase to cause explosion of the secondary battery.

However, according to the present invention, since the first metal part 100 provided adjacent to the electrode assembly in the pouch type secondary battery has thermal conductivity greater than that of the second metal part 200 provided relatively distant from the electrode assembly, the heat may be more quickly released from the region adjacent to the electrode assembly. Thus, it is possible to solve a safety problem of the secondary battery, which may occur when the temperature of the electrode assembly continues to increase.

Referring to FIG. 1, according to another embodiment of the present invention, the first adhesive part 300 of the exterior 10 may include a flame retardant material. For example, the flame retardant material may be mixed in the first adhesive part 300. Thus, according to the present invention, even if fire occurs inside the secondary battery, it is possible to prevent such fire from being spread to the outside of the secondary battery by the flame retardant material mixed in the first adhesive part 300. The flame retardant material may include one or more of phosphorus-based compounds, nitrogen-based compounds, halogen-based compounds, antimony-based compounds, molybdenum-based compounds, zinc borate-based compounds, and metal hydroxides.

Examples of principles in which the flame retardant material performs a flame retardant action include (i) a principle of consuming heat energy used in a combustion process to suppress combustion, (ii) a principle of condensing a combustible material into a solid or gas so that the combustible material does not contact the gas to form a protective film, (iii) a principle of generating a non-combustible gas during the combustion to provide an extinguishing action, and (iv) a principle of suppressing a radical absorption reaction in a radical chain reaction during the combustion reaction. The principle (i) may be performed by metal hydroxides, the principle (ii) may be performed by phosphorus-based compounds, the principle (iii) may be performed by metal hydroxides or antimony-based compounds, and the principle (iv) may be performed by halogen-based compounds.

The first metal part 100 of the exterior 10 may be made of a single metal. However, according to another embodiment of the present invention, the first metal part 100 may be constituted by a plurality of layers made of different materials.

Figure 2:
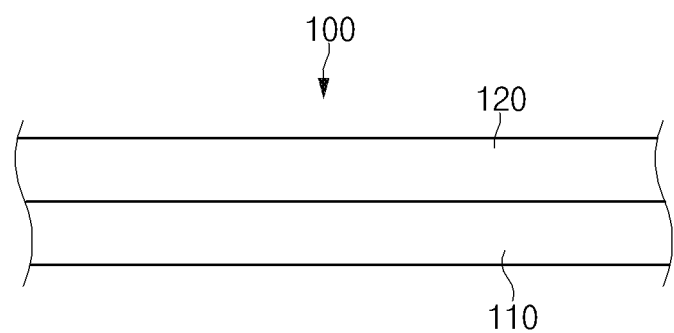
FIG. 2 is an enlarged cross-sectional view illustrating a layered structure of a first metal part in the exterior for the secondary battery according to the present invention.

FIG. 2 is an enlarged cross-sectional view illustrating a layered structure of the first metal part in the exterior for the secondary battery according to the present invention.

As illustrated in FIG. 2, according to another embodiment of the present invention, the first metal part 100 may include a first layer 110 and a second layer 120. When compared to the second layer 120, the first layer 110 may be a layer that is provided relatively adjacent to the internal space of the exterior 10. Here, the first layer 110 may have thermal conductivity greater than that of the second layer 120.

Figure 3:
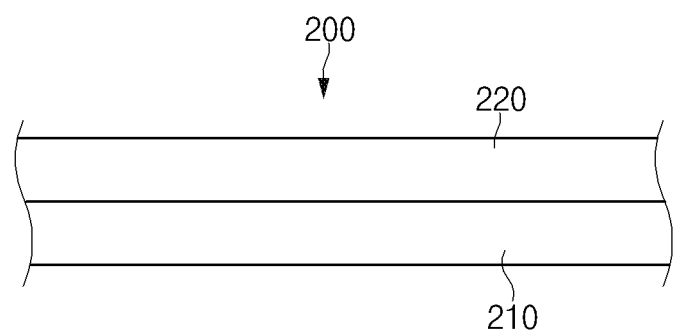
FIG. 3 is an enlarged cross-sectional view illustrating a layered structure of a second metal part in the exterior for the secondary battery according to the present invention.

FIG. 3 is an enlarged cross-sectional view illustrating a layered structure of the second metal part in the exterior for the secondary battery according to the present invention.

Similar to the case of the first metal part 100, according to another embodiment of the present invention, the second metal part 200 may also have a layered structure. That is, the second metal part 200 may include a third layer 210 and a fourth layer 220. When compared to the fourth layer 220, the third layer 210 may be a layer that is provided relatively adjacent to the internal space of the exterior 10. Here, the third layer 210 may have thermal conductivity greater than that of the fourth layer 220.

As described above, when the temperature inside the secondary battery increases, it is necessary to occur more quickly in the region adjacent to the electrode assembly in which heat is generated so as to quickly release the heat within the secondary battery to the outside. Thus, when the thermal conductivity of the first layer 110 is greater than that of the second layer 120, the heat may be quickly released to the outside through the first layer 110 that is relatively adjacent to the electrode assembly when compared to the second layer 120. Likewise, when the thermal conductivity of the third layer 210 is greater than that of the fourth layer 220, the heat may be quickly released to the outside through the third layer 210 that is relatively adjacent to the electrode assembly when compared to the fourth layer 220.

The first layer 110 of the first metal part 100 may include a first material, and the second layer 120 may include a second material. Also, the third layer 210 of the second metal part 200 may include a third material, and the fourth layer 220 may include a fourth material.

Here, as described above, the thermal conductivity of the first layer 110 may be greater than that of the second layer 120, and the thermal conductivity of the third layer 210 may be greater than that of the fourth layer 220. Thus, the first material may have thermal conductivity greater than that of the second material, and the third material may have thermal conductivity greater than that of the fourth material.

For example, each of the first material and the third material may include copper, and each of the second material and the fourth material may include aluminum. Alternatively, each of the first material and the third material may include copper, and each of the second material and the fourth material may include aluminum.

Copper has thermal conductivity greater about 1.5 times than aluminum. Thus, when each of the first layer 110 provided relatively closer to the electrode assembly than the second layer 120 and the third layer 210 provided relatively closer to the electrode assembly than the fourth layer 220 includes copper or is made of copper, the heat within the secondary battery may be more quickly released to the outside.

The first metal part 100 or the second metal part 200 according to the present invention may be made of a clad material.

The clad is a material capable of exerting advantages of each metal by bonding two or more metals to each other, and the bonding between the two or more metals in the clad may be achieved by rolling. When the first layer 110 and the second layer 120 of the first metal part 100 are made of copper and aluminum, respectively, the first metal part 100 made of the clad material may be prepared due to the bonding through the rolling between copper and aluminum. Similarly, when the third layer 210 and the fourth layer 220 of the second metal part 200 are made of copper and aluminum, respectively, the second metal part 200 made of the clad material may be prepared due to the bonding through the rolling between copper and aluminum. This may be applied to the case in which the first to fourth layers are made of different metals.

The secondary battery according to the present invention may include an electrode assembly having a structure, in which electrodes and separators are alternately disposed, and an exterior for the secondary battery, which accommodates the electrode assembly. Description of the structure of the exterior for the secondary battery is replaced with the above description.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An exterior for a secondary battery, in which an internal space is defined, the exterior comprising:
    a first metal part consisting of a first layer consisting of a first material and a second layer consisting of a second material, the first layer located closer to the internal space than the second layer, the first layer having a thermal conductivity greater than a thermal conductivity of the second layer;
    a second metal part spaced apart from the first metal part, the second metal part consisting of a third layer consisting of a third material and a fourth layer consisting of a fourth material, the third layer located closer to the internal space than the fourth layer, the third layer having a thermal conductivity greater than a thermal conductivity of the fourth layer; and
    a first adhesive part extending between the first metal part and the second metal part and adhering to each of the first metal part and the second metal part,
    wherein the first metal part is disposed closer to the internal space than the second metal part, and
    the first metal part has a thermal conductivity greater than a thermal conductivity of the second metal part.

2. The exterior of claim 1, wherein a flame retardant material is mixed in the first adhesive part.

3. The exterior of claim 1, wherein the first metal part or the second metal part is made of a clad material.

4. The exterior of claim 2, wherein the flame retardant material comprises one or more of: phosphorus-based compounds, nitrogen-based compounds, halogen-based compounds, antimony-based compounds, molybdenum-based compounds, zinc borate-based compounds, and metal hydroxides.

5. The exterior of claim 1, further comprising:
    an insulation part spaced apart from the first metal part in a direction towards the internal space and having an electrical insulation property; and
    a second adhesive part extending between the first metal part and the insulation part and adhering to each of the first metal part and the insulation part.

6. The exterior of claim 1, wherein the first material is copper, and the second material is aluminum.

7. The exterior of claim 1, wherein the third material is copper, and the fourth material is aluminum.

8. The exterior of claim 5, wherein each of the first adhesive part and the second adhesive part comprises acid modified polypropylene (PPa), and the insulation part comprises cast polypropylene (CPP).

9. The exterior of claim 1, further comprising:
    a first outer surface part laminated on an outer surface of the second metal part; and
    a second outer surface part laminated on an outer surface of the first outer surface part,
    wherein the first outer surface part comprises oriented nylon (O-nylon), and the second outer surface part comprises polyethylene terephthalate (PET).

10. A secondary battery comprising:
    an electrode assembly; and
    the exterior of claim 1, the exterior extending around the electrode assembly and enclosing the electrode assembly within the internal space.

* * * * *